Feb. 20, 1951 W. LAMB 2,542,254
FLEXIBLE VALVE MEMBER
Filed March 22, 1948
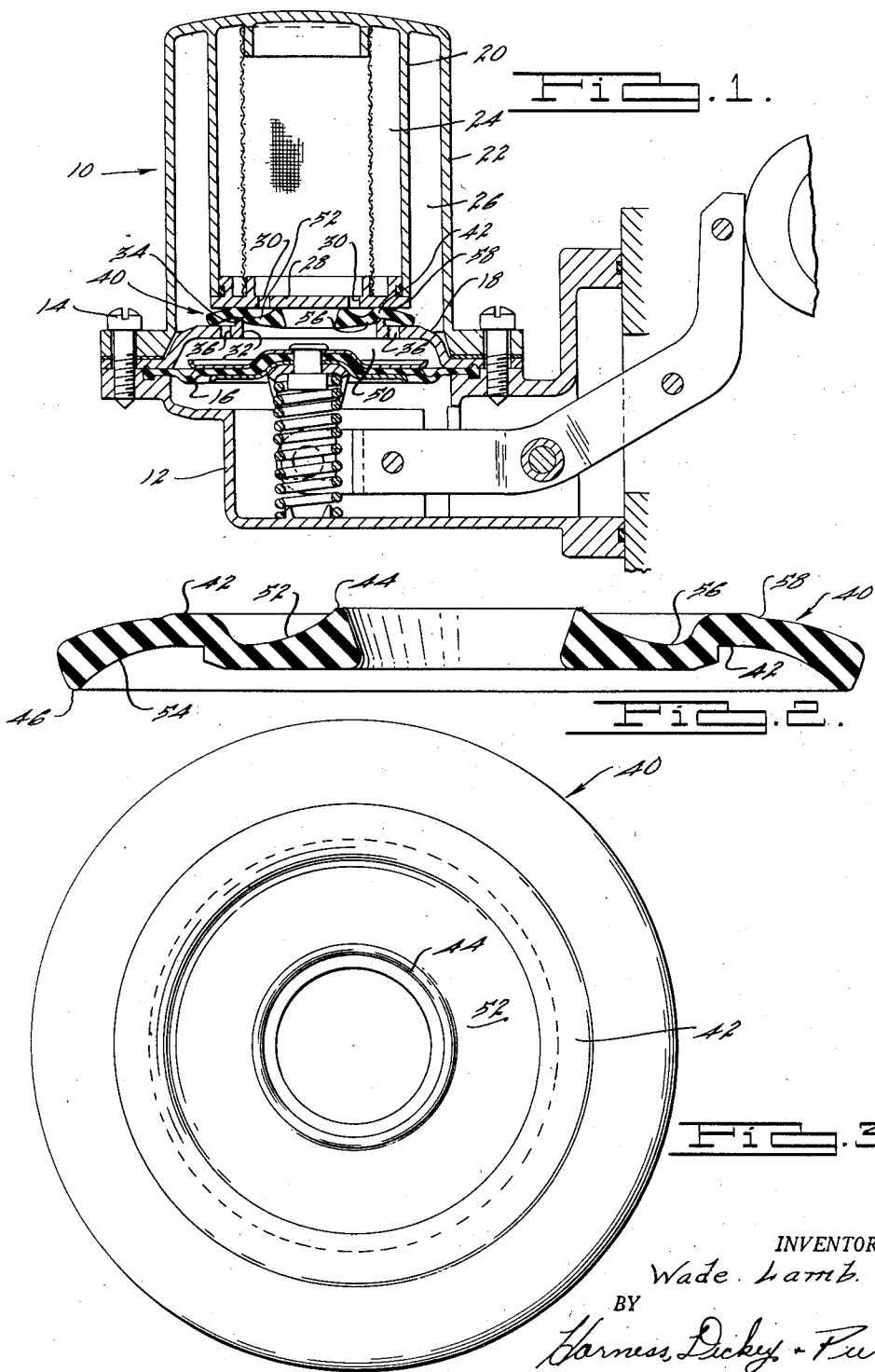
INVENTOR.
Wade Lamb.
BY
Harness, Dickey & Pierce
ATTORNEYS.

Patented Feb. 20, 1951

2,542,254

UNITED STATES PATENT OFFICE 2,542,254

FLEXIBLE VALVE MEMBER

Wade Lamb, Detroit, Mich., assignor to F. L. Jacobs Co., Detroit, Mich., a corporation of Michigan Application March 22, 1948, Serial No. 16,341

13 Claims. (Cl. 277—45)

1

The invention relates to a fuel pump and more particularly to a fuel pump having improved valve means for controlling the flow of fuel through the pump.

One object of the present invention is to provide a fuel pump having an improved unitary flexible valve member, one portion of which is adapted to flex to permit fuel to be drawn into the pump and another portion of which is adapted to flex to permit fuel to be discharged from the pump.

Another object of the invention is to provide in a fuel pump of the type mentioned an improved annular flexible valve member, the flow controlling surfaces of which are gradually or fairly curved to insure a smooth and nonturbulent flow of fuel through the pump.

It is also an object of this invention to provide a fuel pump having an improved annular flexible valve member of the type having an annular sealing bead, and which is so constructed that the sealing bead will not buckle or warp or otherwise improperly seat, either as a result of the growth known to occur even in hydrocarbon resistant synthetic rubbers when immersed in aromatic fuels for extended periods, or as a result of the repeated flexing incident to operation of the pump.

A further object of the present invention is to provide a fuel pump of the above-mentioned type having an annular flexible valve member having inner and outer annular sealing beads adapted to engage cooperating portions of the pump and a portion intermediate the inner and outer sealing beads adapted to be clamped between cooperating members of the pump, and in which the annular flexible valve member is so constructed that during operation of the pump the major portion of the flexure of the valve member occurs adjacent the clamped portion and in spaced relation to the adjacent of the inner and outer beads.

Other and more detailed objects of the invention will become apparent from a consideration of the accompanying drawings, the following specification, and the appended claims.

Referring to the drawings:

Figure 1 is a view in cross section showing a fuel pump constructed according to one form of the invention;

Fig. 2 is an enlarged view in cross section of the flexible valve member shown in Fig. 1 illustrating the valve member in its free or non-flexed condition; and Fig. 3 is a plan view on a smaller scale of the valve member shown in Fig. 2.

2

Referring to Fig. 1 of the drawing, the fuel pump there illustrated is generally similar to that illustrated and described in greater detail in the copending application of Cornelius W. Van Ranst for United States Letters Patent, Serial No. 675,113, filed June 7, 1946, now Patent Number 2,529,204, November 7, 1950. For the present purposes, it is sufficient to say that the pump is of the diaphragm type operated from the engine camshaft and comprises upper and lower casing members 10 and 12 having outwardly projecting flanges secured together by a plurality of screws 14 and between which are clamped the peripheral portions of a diaphragm 16 and a transversely extending plate 18. The upper casing member 10 has inner and outer cylindrical walls 20 and 22 respectively defining a central inlet chamber 24 and a surrounding annular outlet chamber 26. At its lower end the inlet chamber 24 is closed by a transversely extending wall member 28 which sealingly fits the lower end of the wall 20. The wall member 28 is provided with a plurality of inlet openings 30 disposed on a circle concentric with the wall member 28 and spaced inwardly of its peripheral portion.

The transversely extending plate 18 has a central portion extending parallel and in spaced relation to the wall member 28 and has an enlarged central aperture 32 and an annular portion 34 surrounding the aperture 32 and projecting toward the wall member 28. Outwardly of the annular portion 34 the plate 18 has a plurality of outlet openings 36.

A flexible annular valve member 40 is disposed intermediate the plate 18 and the wall member 28 and has an annular mounting portion 42 intermediate its inner and outer peripheries which is clamped between the annular projection 34 on the plate 18 and the adjacent surface of the wall member 28 to form an annular seal therebetween. The flexible valve member 40 is preferably formed of a hydrocarbon resistant synthetic rubber such as neoprene or the like. The valve member 40 is formed to provide an annular sealing bead 44 adjacent its inner periphery and adapted to engage the wall member 28 inwardly of the inlet openings 30. The flexible valve member 40 is also shaped to provide an annular sealing bead 46 adjacent its outer periphery and adapted to engage the plate 18 outwardly of the outlet openings 36 formed therein.

It will now be appreciated that a pumping chamber 50 is defined by the diaphragm 16, the plate 18, the valve member 40 and the wall member 28.

It will also be appreciated that during a downstroke of the diaphragm 16 as viewed in Fig. 1, the portion of the valve member 40 inwardly of the mounting portion 42 will be flexed to unseat the sealing bead 44 from the wall member 28 and permit fuel to be drawn from the inlet chamber 24 through the inlet openings 30 into the pumping chamber 50. Likewise, it will be apparent that upon an upward stroke of the diaphragm 16 as viewed in Fig. 1, the sealing bead 44 will be held in engagement with the plate 28 and the portion of the flexible valve member 40 outwardly of the mounting portion 42 will be flexed to unseat the sealing bead 46 from its engagement with the plate 18, permitting fuel to be forced from the pumping chamber 50, out through the outlet openings 38 to the outlet chamber 26.

Intermediate the mounting portion 42 and the annular sealing bead 44, the valve 40 is provided with an annular depression or recess 52 overlying and communicating with the inlet openings 30. The valve member 40 is formed so that in diametrical cross section, as illustrated in Fig. 2, the wall of the recess defines a fair or gradual curve insuring a smooth "Venturi-like" flow of fuel during the suction or down stroke of the diaphragm 16 during which fuel is drawn into the pumping chamber 50 past the sealing bead 44. Also outwardly of the mounting portion 42 and on its opposite side the flexible valve member 40 is provided with a similar annular depression or recess 54 intermediate the mounting portion 42 and the annular sealing bead 46, which recess overlies and communicates with the outlet openings 36 formed in the plate 18. Also outwardly of the mounting portion 42 the valve member 40 is so formed that in diametrical cross-section, as illustrated in Fig. 2, the wall of the recess 54 defines a gradual or fair curve facilitating a smooth or "Venturi-like" flow of the fuel from the pumping chamber 50 past the sealing bead 46 to the outlet chamber 26, during an upward stroke of the diaphragm 16.

The flexible valve member 40 is shaped to provide annular portions 56 and 58 disposed respectively inwardly and outwardly of the mounting portions 42, which are of minimum thickness. From each of these points of minimum thickness to the adjacent of the sealing beads 44 and 46, the thickness of the valve member 40 gradually increases (and increases at an increasing rate) until it reaches a maximum thickness at the sealing beads 44 and 46. In the preferred embodiment illustrated, the rate of increase of this thickness increases as the bead is approached. This construction insures that the major portion of the flexing of the valve member 40 will occur adjacent the mounting portion 42 and that substantially no flexure will occur adjacent the sealing beads 44 and 46. By thus insuring that substantially all of the flexure occurs adjacent the mounting portion 42 and in spaced relation to the sealing beads 44 and 46 of this construction prevents warping and buckling of the sealing beads and consequent improper seating and leaks past the sealing beads, resulting in poor operation and frequently in complete failure of the valve member.

Also in a valve member of this construction when the growth incident to immersion for an extended period in aromatic fuels takes place, both of the sealing beads remain flat and continue to provide a proper seal. This is for the reason that the portion outwardly of the mounting portion, which is firmly held between the wall member 28 and the plate 18, is free to expand and increase its overall diameter, and the portion inwardly of the mounting portion 42 will absorb the growth by flexing slightly downwardly, as viewed in Fig. 1 at or near the portion 56 of minimum thickness. The progressively increasing thickness of the valve member to a maximum adjacent its inner periphery prevents material growth radially inwardly and prevents buckling or warping of the sealing bead 44, by insuring that the growth will be taken up by flexing in the above-described manner.

It will be appreciated, of course, that the flexible valve member described above may be readily incorporated in fuel pump constructions other than the illustrative construction shown and described herein, and although only one form of the invention has been illustrated and described in detail herein, it will be apparent to those skilled in the art that numerous modifications and changes may be made without departing from the spirit of the invention or the scope of the appended claims.

What is claimed is:

1. In a fuel pump, a housing having inlet and outlet chambers concentrically arranged and a transversely extending wall member, a plate member mounted on said housing in spaced parallel relation to said wall member, said plate member and said wall member being apertured to permit fuel to flow between said inlet and outlet chambers, an annular resilient rubber valve element disposed between said plate and said wall member and having an annular mounting portion intermediate its inner and outer peripheries which is gripped and provides an annular seal between cooperating annular portions of said members, said valve element having an annular sealing bead spaced radially inwardly of said annular mounting portion and engaging one of said members inwardly of the apertured portion thereof, said valve element having another annular sealing bead spaced radially outwardly of said mounting portion and engaging the other of said members outwardly of the apertured portion thereof, said valve element being adapted to flex to move said sealing beads into and out of engagement with said members, said valve element having an inner annular recess disposed intermediate said mounting portion and said first named sealing bead on one face of said element and adapted to overlie the apertured portion of said one of said members, and said valve element having an outer annular recess disposed intermediate said mounting portion and said lastnamed sealing bead on the opposite face of said element and adapted to overlie the apertured portion of said other of said members, said valve element being so shaped that in diametrical cross section the wall of each of said recesses describes a fair curve adapted to permit fuel to flow smoothly therealong.

2. In a fuel pump, a housing having inlet and outlet chambers concentrically arranged and a transversely extending wall member, a plate member mounted on said housing in spaced parallel relation to said wall member, said plate member and said wall member being apertured to permit fuel to flow between said inlet and outlet chambers, an annular resilient rubber valve element disposed between said plate and said wall member and having an annular mounting portion intermediate its inner and outer peripheries which is gripped and provides an annular seal between cooperating annular portions of said members, said valve element having an annular sealing bead spaced radially inwardly of said annular mounting portion and engaging one of said members inwardly of the apertured portion thereof, said valve element having another annular sealing bead spaced radially outwardly of said mounting portion and engaging the other of said members outwardly of the apertured portion thereof, said valve element being adapted to flex to move said sealing beads into and out of engagement with said members, said valve element having an inner annular recess disposed intermediate said mounting portion and said first named sealing bead on one face of said element and adapted to overlie the apertured portion of said one of said members, and said valve element having an outer annular recess disposed intermediate said mounting portion and said last-named sealing bead on the opposite face of said element and adapted to overlie the apertured portion of said other of said members, said valve element being so shaped that in diametrical cross section said sealing beads are rounded and the wall of each of said recesses describes a fair curve continuous with the rounded surface of the adjacent of said beads and adapted to permit fuel to flow smoothly therealong.

3. In a fuel pump, a housing having inlet and outlet chambers concentrically arranged, and a transversely extending wall member, a plate member mounted on said housing in spaced parallel relation to said wall member, said plate member and said wall member being apertured to permit fuel to flow between said inlet and outlet chambers, an annular resilient rubber valve element disposed between said plate and said wall member and having an annular mounting portion intermediate its inner and outer peripheries which is gripped between and provides an annular seal between cooperating annular portions of said members, said valve element having an annular sealing bead spaced radially inwardly of said annular mounting portion and engaging one of said members inwardly of the apertured portion thereof, said valve element having another annular sealing bead spaced radially outwardly of said mounting portion and engaging the other of said members outwardly of the apertured portion thereof, said valve element being adapted to flex to move said sealing beads into and out of engagement with said members, said valve element having an inner annular recess disposed intermediate said mounting portion and said first-named sealing bead on one face of said element and adapted to overlie the apertured portion of said one of said members, and said valve element having an outer annular recess disposed intermediate said mounting portion and said last-named sealing bead on the opposite face of said element and adapted to overlie the apertured portion of said other of said members, said valve element being so formed that the thickness of said valve element, both radially inwardly and radially outwardly from said annular mounting portion, progressively increases from a minimum at a point adjacent said mounting portion to a maximum at the adjacent of said sealing beads.

4. In a fuel pump, a housing having inlet and outlet chambers concentrically arranged, and a transversely extending wall member, a plate member mounted on said housing in spaced parallel relation to said wall member, said plate member and said wall member being apertured to permit fuel to flow between said inlet and outlet chambers, an annular resilient rubber valve element disposed between said plate and said wall member and having an annular mounting portion intermediate its inner and outer peripheries which is gripped between and provides an annular seal between cooperating annular portions of said members, said valve element having an annular sealing bead spaced radially inwardly of said annular mounting portion and engaging one of said members inwardly of the apertured portion thereof, said valve element having another annular sealing bead spaced radially outwardly of said mounting portion and engaging the other of said members outwardly of the apertured portion thereof, said valve element being adapted to flex to move said sealing beads into and out of engagement with said members, said valve element having an inner annular recess disposed intermediate said mounting portion and said first-named sealing bead on one face of said element and adapted to overlie the apertured portion of said one of said members, and said valve element having an outer annular recess disposed intermediate said mounting portion and said last-named sealing bead on the opposite face of said element and adapted to overlie the apertured portion of said other of said members, said valve element being so formed that the thickness of said valve element, both radially inwardly and radially outwardly from said annular mounting portion, progressively increases from a minimum at a point adjacent said mounting portion to a maximum at the adjacent of said sealing beads, said thickness of said element increasing relatively slowly adjacent said point of minimum thickness and relatively rapidly adjacent the sealing bead.

5. In a fuel pump, an annular resilient rubber valve element having an annular mounting portion intermediate its inner and outer peripheries, said valve element having an annular sealing bead spaced radially inwardly of said mounting portion and disposed on one face of said element, said valve element having another annular sealing bead spaced radially outwardly of said mounting portion and disposed on the opposite face of said element, said element being adapted to flex to move said sealing beads axially of said annular mounting portion, said valve element being so shaped that in diametrical cross section the portion of the surface of the valve element face adjacent each of said beads describes a fair curve adapted to permit fuel to flow smoothly therealong.

6. In a fuel pump, an annular resilient rubber valve element having an annular mounting portion intermediate its inner and outer peripheries, said valve element having an annular sealing bead spaced radially inwardly of said mounting portion and disposed on one face of said element, said valve element having another annular sealing bead spaced radially outwardly of said mounting portion and disposed on the opposite face of said element, said element being adapted to flex to move said sealing beads axially of said annular mounting portion, said valve element being so shaped that in diametrical cross section said sealing beads are rounded and the portion of the surface of the valve element face adjacent each of said beads describes a fair curve continuous with the rounded surface of the adjacent of said beads and adapted to permit fuel to flow smoothly therealong.

7. An annular resilient rubber valve element for a pump having an annular mounting portion intermediate its inner and outer peripheries, said valve element having an annular sealing bead spaced radially inwardly of said mounting portion and disposed on one face of said element, said valve element having another annular sealing bead spaced radially outwardly of said mounting portion and disposed on the opposite face of said element, said element being adapted to flex to move said sealing beads axially of said annular mounting portion, said valve element being so formed that the thickness of said valve element, both radially inwardly and radially outwardly from said annular mounting portion, progressively increases from a minimum at a point adjacent said mounting portion to a maximum at the adjacent of said sealing beads.

8. An annular resilient rubber valve element for a pump having an annular mounting portion intermediate its inner and outer peripheries, said valve element having an annular sealing bead spaced radially inwardly of said mounting portion and disposed on one face of said element, said valve element having another annular sealing bead spaced radially outwardly of said mounting portion and disposed on the opposite face of said element, said element being adapted to flex to move said sealing beads axially of said annular mounting portion, said valve element being so formed that the thickness of said valve element, both radially inwardly and radially outwardly from said annular mounting portion, progressively increases from a minimum at a point adjacent said mounting portion to a maximum at the adjacent of said sealing beads, said thickness of said element increasing relatively slowly adjacent said point of minimum thickness and relatively rapidly adjacent the sealing bead.

9. An annular element made of resilient material forming a double-acting valve for a pump, said element having an annular mounting portion intermediate the inner and outer peripheral edges, the material from said mounting portion to said edges increasing in thickness and forming a sealing bead at each of said edges.

10. An annular element made of resilient material forming a double-acting valve for a pump, said element having an annular mounting portion intermediate the inner and outer peripheral edges, the material from said mounting portion to said edges increasing in thickness and forming a sealing bead at each of said edges, said sealing beads at the inner and outer edges being disposed on the opposite sides of said element.

11. An annular element made of resilient material forming a double-acting valve for a pump, said element having a shoulder on one side intermediate the inner and outer peripheral edges, said material increasing in thickness from said shoulder to said peripheral edges and terminating in a sealing bead at each of said edges.

12. An annular element made of resilient material forming a double-acting valve for a pump, said element having a shoulder on one side intermediate the inner and outer peripheral edges, said material increasing in thickness from said shoulder to said peripheral edges and terminating in a sealing bead at each of said edges, said sealing bead on the inner peripheral edge being on the opposite side of said element from said shoulder.

13. An annular element made of resilient material forming a double-acting valve for a pump, said element having a shoulder on one side intermediate the inner and outer peripheral edges, a ridge on the opposite side of said element in the vicinity of said shoulder, said material increasing in thickness from said shoulder and ridge to said peripheral edges and terminating in a sealing bead at each of said edges, said sealing bead on the inner peripheral edge being on the opposite side of said element from said shoulder, said sealing bead on the outer peripheral edge being on the same side of said element as said shoulder.

WADE LAMB.

REFERENCES CITED

The following references are of record in the file of this patent:

UNITED STATES PATENTS

| Number | Name | Date |
|---|---|---|
| 1,878,440 | Duffy | Sept. 20, 1932 |
| 2,242,582 | Jencick | May 20, 1941 |